3,374,277
DIOL OF POLY(ISOBUTYLENE OXIDE)
Edwin J. Vandenberg, Foulk Woods, Del., assignor to Hercules Incorporated, a corporation of Delaware
No Drawing. Continuation-in-part of application Ser. No. 298,434, July 29, 1963. This application Oct. 20, 1965, Ser. No. 499,035
2 Claims. (Cl. 260—615)

This application is a continuation-in-part of my copending application Ser. No. 298,434, filed July 29, 1963 now Patent No. 337,487.

This invention relates to new dihydroxy polyethers, and more particularly to diols of poly(isobutylene oxide).

It has previously been discovered that high molecular crystalline polymers of isobutylene oxide can be prepared by polymerizing isobutylene oxide under certain selected conditions, such as by using an organic diluent and certain organometallic catalysts.

Now in accordance with this invention, it has been found that these high molecular weight crystalline polymers can be cleaved to produce polyethers having a terminal hydroxyl group at each end of the polymer chain. These new hydroxyl-ended polyethers may be defined as diols of poly(isobutylene oxide) wherein each of the hydroxyls is terminal. These new idols have a number average molecular weight of from about 500 to about 20,000 and perferably of from about 1,000 to about 10,000 and are crystalline.

The high molecular weight poly(isobutylene oxide) is readily cleaved by reacting the polymer with an organometallic compound of an alkali metal, and the cleavage product is then treated with a weak aqueous acid to hydrolyze the end groups to hydroxyl groups.

The theory of this invention is illustrated by the following equations for the cleavage of poly(isobutylene oxide) with an organolithium compound (LiR), wherein abstraction of hydrogen on a carbon atom beta to the ether linkage leads to cleavage. As will be seen, there are, for any given ether linkage in the polymer chain of poly(isobutylene oxide), two positions wherein a hydrogen is attached to a carbon beta to the ether linkage, hence there are two possible chain cleavage reactions, both involving cleavage on the left side of the ether linkage. It will be appreciated that the $\beta_2$ cleavage can occur at either one of the side chain methyl substituents shown in Equation 1 and there designated as $\beta_{2a}$ and $\beta_{2b}$. No other distinction is made between these $\beta_2$ hydrogens in any of the equations. The two cleavage reactions involving these two beta hydrogens ($\beta_1$ and $\beta_2$) are shown by Equations 1 and 2 below. R represents the remainder of the polymer chain in these equations. Obviously, no cleavage can occur on the right side of the ether linkage because no beta hydrogen is available for such cleavage. In any one cleavage reaction there will undoubtedly take place both $\beta_1$ and $\beta_2$ cleavages. Consequently, the end product will be a mixture of these cleavage products. As will be seen from these equations, under some conditions, part of the end groups in the cleavage product contain double bonds, e.g., 1-isobutenyl in Product A and 2-methyl-prop-1-en-3-yl in Product B. The 1-isobutenyl end groups are readily hydrolyzed to hydroxyl end groups by acid washing, as shown in Equation 3. The 2-methyl-prop-1-en-3-yl end groups isomerize under the influence of the LiR' or LiOR present in the reaction mixture to 1-isobutenyl end groups which are readily converted to hydroxyl end groups by acid hydrolysis.

Left Side Cleavage

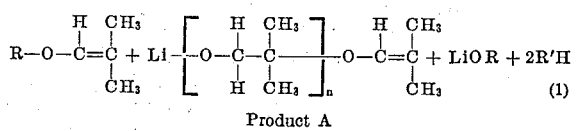

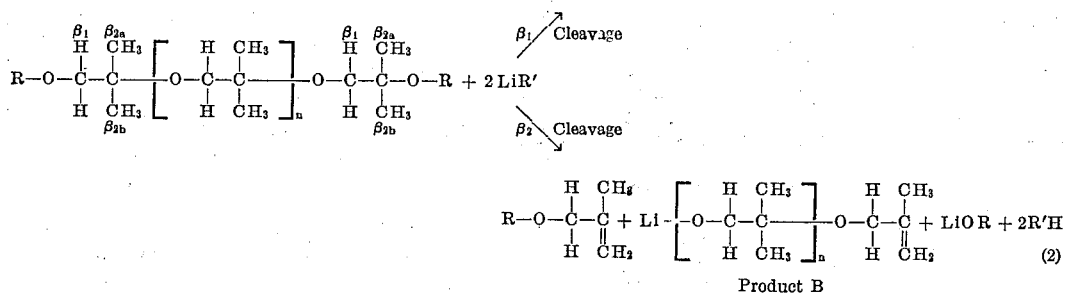

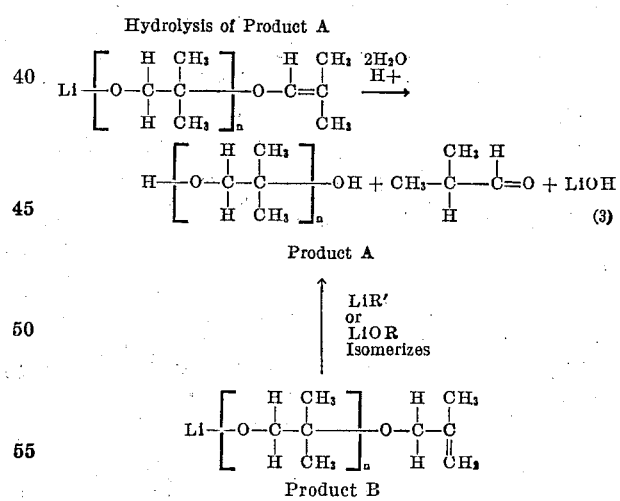

The cleavage reaction is carried out by reacting the high molecular weight crystalline poly(isobutylene oxide) with an organometallic compound of an alkali metal. Any organometallic compound of an alkali metal, i.e., lithium, sodium, potassium, rubidium or cesium, can be used. The organo moiety will preferably be a hydrocarbon group, as for example, an alkyl, aryl, alkenyl, alkynyl, cycloalkyl, cycloalkenyl, or aralkyl, etc., group. Exemplary of the alkali metal organometallic compounds that can be used are methyl lithium, ethyl lithium, isopropyl lithium, n-butyl lithium, isobutyl lithium, tert-butyl lithium, amyl lithium, decyl lithium, octadecyl lithium, cyclohexyl lithium, cyclohexenyl lithium, phenyl lithium, naphthyl lithium, vinyl lithium, lithium acetylide, methyl sodium, ethyl sodium, propyl sodium, isopropyl sodium, the butyl sodiums, amyl sodium, dodecyl sodium, benzyl sodium, isopropenyl sodium, allyl sodium, octadecenyl sodium, butadienyl sodium, isoprenyl sodium, butylrubidium, butylcesium, methyl-, ethyl-, propyl- and the butylpotassiums, allylpotassium, octylpotassium, phenylpotassium, cyclopentylpotassium, cyclohexenylpotassium, etc. The amount of the organometallic compound used will depend upon the amount of the cleavage desired, one molecule of the organometallic being required for each cleavage, i.e., per two chain ends. Thus, the amount of organometallic compound can vary from about 1% up to a large excess, as for example, 5 to 10 times the weight of the polymer being cleaved, but preferably will vary from about 1% to about 100% by weight of the polymer being cleaved.

The cleavage reaction can be carried out in the absence of a diluent, i.e., in a bulk process, but preferably is carried out in a diluent, which may be a solvent for the polymer being cleaved, or which may serve only as a dispersant for the polymer. Any organic liquid diluent that is inert under the reaction conditions can be used, as for example, aromatic hydrocarbons such as benzene, toluene, xylene, etc., aliphatic and cycloaliphatic hydrocarbons such as hexane, n-heptane, cyclohexane, etc., and mixtures of such hydrocarbons, as for example, petroleum ether, gasoline, etc. Diluents that are capable of reaction with the organometallic compound (or other cleaving agent), as for example, ethers, can also be used, provided that the rate of reaction of the cleaving agent with the polymer being cleaved exceeds the rate of reaction with the diluent. The concentration of the polymer in the diluent can vary from a fraction of about 1% up to an essentially diluent-free system. As already mentioned, the polymer can be dissolved in the diluent or a slurry of the polymer in a diluent can be used. Generally, it is preferred to use conditions such that the polymer solution or dispersion is stirrable. Usually the polymer concentration will be in the 2 to 50% range. As noted above, the process can be operated in the absence of a diluent, particularly in the case of polymers which on cleavage become more and more fluid, or by carrying out the process in an extruder after which the cleaved fluid product can be handled in more conventional equipment in a continuous process.

The cleavage reaction can be carried out over a wide temperature range, generally from about −50° C. to about 200° C., depending on the reactivity of the polymer and the cleaving agent, the stability of the cleaving agent, etc. Preferably, the reaction is carried out at a temperature of from about −20° C. to about 150° C., and more preferably, from about 0° C. to about 125° C. The pressure can be atmospheric, subatmospheric, or above atmospheric, if desired. In fact, pressures up to several thousand p.s.i. can be used if needed to keep the diluent in the liquid state.

The high molecular weight crystalline poly(isobutylene oxide)s that are cleaved to prepare the diols of this invention can be prepared by any desired means. Polyethers of high molecular weight are readily prepared according to the process of my patent U.S. 3,135,705, issued June 2, 1964, using as the catalyst an organoaluminum compound, which may or may not be reacted in a hydrocarbon diluent, with water or with both water and a chelating agent. A typical catalyst preparation is carried out by reacting a solution of the organoaluminum compound, as for example, triethylaluminum or triisobutylaluminum, in n-heptane, as solvent, with 0.5 mole of water per mole of aluminum, and agitating the mixture at 30° C. for 16 to 20 hours. The polymerization is typically carried out by injecting the catalyst solution so prepared into a solution of the isobutylene oxide in an inert diluent and agitating the mixture at −80° C. or lower for several hours. Alternatively, certain modified organomagnesium catalysts can be used to prepare these high molecular weight crystalline polymers. For example, a dialkylmagnesium reacted with an activating agent such as ammonia, ethylenediamine, diethylenetriamine, etc., can be used as the catalyst. Suitable dialkylmagnesiums that can be so reacted and used are diethylmagnesium, dibutylmagnesium, dioctylmagnesium, etc. Using this procedure, the polymerization is generally carried out at a temperature within the range of −30° C. to 100° C.

The highly insoluble polymer produced by one of the above processes is freed of catalyst by acid washing, washing neutral with water, after which the polymer is collected by filtration, and after stabilizing it with a small amount of anti-oxidant, it is dried.

The poly(isobutylene oxide) which is cleaved will be one of fairly high molecular weight, so that the original end groups in the polymer being cleaved are an insignificant part of the total final end groups, and the individual polymer molecules in the cleaved product will then have hydroxyl end groups on both ends. The polymer being cleaved will preferably have a chain length of at least about 100 of said monomer groups and more preferably at least about 500. The actual molecular weight of the polymer being cleaved and the number of cleavages per polymer molecule will, of course, depend on the purpose for which the final polymer is to be used.

The high polymer can be isolated from the polymerization reaction vessel prior to the initiation of cleavage, or the cleavage reaction can be commenced in the same vessel without isolation.

To produce the diols of poly(isobutylene oxide) of this invention, the reaction product of the above described cleavage reaction must be treated to remove the alkali metal ions. This can be easily accomplished by simply washing the reaction mixture with water (basic, neutral or acidic) or with a weak acid solution (aqueous or non-aqueous), as for example, dilute hydrochloric, formic, acetic, oxalic, sulfuric, sulfurous, nitric, sulfonic or carbonic acids or the like, under conditions such that dehydration of the tertiary alcohol end groups is avoided. Aqueous acid treatment removes the 1-isobutenyl end groups, which are hydrolyzed to the corresponding hydroxyl end groups.

The hydroxyl-ended polymers of this invention can be prepared in a wide variety of molecular weights, depending on the molecular weight of the starting polymer and the amount of cleavage to which it is subjected. In general, they will be prepared with a number average molecular weight of from about 500 to about 20,000, and preferably of from about 1,000 to about 10,000. These products are diols, having terminal hydroxyl groups on both ends of the polymer chains. The polymeric diols of this invention are crystalline and have very high melting points on the order of 150° C. to 175° C.

Because the diol products of this invention have hydroxyl groups at each end of their polymer chains, they can be used in various chain extension reactions. The chain extending agents can be any polyfunctional compounds which react under appropriate reaction conditions, i.e., temperature, pressure and catalyst, with the hydroxyl groups. They can be di- or polyisocyanates such as m- or p-phenylene diisocyanate, 2,4-toluene diisocyanate, 1,5-naphthyl diisocyanate, methylene di(p-phenyl diisocyanate), hexamethylene diisocyanate, triphenyl methane triisocyanate, etc.; di- or polyepoxides such as Epon resins, as for example, the diglycidyl ether of Bis Phenol-A, or di- or triaziridines, as for example, tris[1-(2-methyl) aziridinyl] phosphine oxide, tris(1-aziridinyl) phosphine oxide, or di- or polyanhydrides such as pyromellitic anhydride, or di- or polyimides such as phenylene bis-maleimide, etc. The difunctional chain extending agents are generally used in approximately stoichiometric amounts to the hydroxyl chain ends when a linear, soluble high polymer product is desired. When the chain extending agent contains more than two functional groups and is used in approximately stoichiometric amounts to the hydroxyl chain ends, the product is generally a cross-linked product. Alternatively, a cross-linked network can be obtained by using a combination of a difunctional active chain end polymer with low molecular weight similar polyreactive compounds. Thus, the diols of this invention, having hydroxyls on both ends of the polymer chain, on combination with a polyol such as glycerin, pentaerythritol, trimethylol propane, sorbitol, tetrakis(2-hydroxypropyl) ethylenediamine, or ethylene oxide or propylene oxide adducts of these polyols in combination with the diisocyanate, will yield a cross-linked polyurethane network.

The new diols of poly(isobutylene oxide) of this invention can also be converted to useful polyester and polyamide block copolymers, by the usual polyester and polyamide forming reactions, using either a simple monomeric unit such as the phthalic acids or esters, or using preformed polyesters or polyamides with appropriate reactive chain ends. Interfacial polymerization is advantageously used to prepare such materials by using acid chlorides of dicarboxylic acids or of carboxy-ended polyesters or polyamides with the diols. Alternatively, an amine-ended polyamide can be reacted with a chloroformate-ended diol (formed by the reaction of the diol with phosgene) to give a polyether-polyamide block copolymer joined by polyurethane links. The chloroformate-ended diol can also be reacted by interfacial polymerization with hydrazine or simple diamines to form polyurethane type products. The diols can also be end-capped, by reaction with at least two moles of a di- or polyisocyanate, to give a product with reactive isocyanate end groups which can then be reacted with a diamine, such as hydrazine, ethylenediamine, phenylenediamine, etc., or an amine-ended polyamide, to give block-type copolymers containing urea links which are advantageous for increasing the softening point and improving the abrasion resistance of the polymer.

The crystalline diols of this invention can be further modified to yield useful products. For example, they may be reacted in the presence of a base with other epoxides such as ethylene oxide, propylene oxide, butene-1 oxide, etc. Such adducts may be diadducts, i.e., the hydroxyl end groups converted to more reactive hydroxyethyl (ethylene oxide reaction) or hydroxypropyl (propylene oxide reaction) end groups. Such products, because of their reactivity with isocyanates, are especially useful for foam, particularly for the very useful one-shot foam processes. The adducts may consist of large blocks (5 to 100 units) of ethyleneoxide, amorphous propylene oxide, amorphous butene-1 oxides, etc. Such block polymers containing the diol units of this invention are unique, and are unusually useful surface-active agents, adhesives, and protective colloids. The ethylene oxide type are especially useful as detergents, dispersing agents, antistatic agents, dyeing aids, additives or coatings for fibers to prevent soil redeposition during laundering, etc.

The following examples illustrate the process of this invention. All parts and percentages are by weight unless otherwise indicated. All examples were run under a nitrogen atmosphere. The molecular weight of the polymers is indicated by their reduced specific viscosities (RSV). By the term "reduced specific viscosity" is meant $n_{sp}/c$ determined on a 0.1% solution in dry $\alpha$-chloronaphthalene at 170° C., or at 135° C. after dissolving at 170° C. The number average molecular weight (Mn) was determined by the Rast method in camphor, or with a Mechrolab osmometer in $\alpha$-chloronaphthalene at 135° C. The calculated Mn was calculated from the hydroxyl analysis, assuming 2 hydroxyls per chain. Hydroxyl analysis was determined by infrared. Where the melting point of the polymer is given, it was determined by differential thermal analysis (DTA).

EXAMPLE 1

The poly(isobutylene oxide) used in this example was prepared by polymerizing a purified isobutylene oxide in n-heptane with triisobutylaluminum, as catalyst, at −78° C. for 19 hours. The polymer so obtained had an RSV of 0.18 as measured in $\alpha$-chloronaphthalene at 135° C. and a melting point of 175° C.

One part of this poly(isobutylene oxide) was dissolved in 43 parts of anhydrous toluene at 135° C. The solution was then cooled to 90° C. and 0.096 part of lithium butyl in 0.6 part of n-hexane was added. The reaction mixture was stirred for 15 minutes, and the temperature dropped to 70° C. Then 0.4 part of anhydrous ethanol was added as a shortstop. The reaction mixture was then cooled to room temperature and washed many times with water saturated with carbon dioxide. It was then heated for 1.5 hours at 65–100° C. with carbon dioxide saturated water, cooled and water washed. The insoluble polymer was then collected by filtration, washed twice with benzene and dried. The product amounted to 0.80 part of a white solid which had an Mn (Rast) of 1818. Infrared analysis on a pressed film of the product indicated 1.1% hydroxyl and about 0.4% >C=CH— unsaturation. This compares with the original uncleaved poly(isobutylene oxide) which, by infrared, was shown to contain 0.2% maximum hydroxyl and 0.1% >C=CH— unsaturation.

EXAMPLE 2

The poly(isobutylene oxide) used in this example was prepared by polymerizing isobutylene oxide with a modified diethylmagnesium as catalyst at 30° C. for 24 hours. The catalyst was prepared by mixing 20 ml. of a 0.5 M solution of diethylmagnesium in diethyl ether under nitrogen with 0.304 part of diethylenetriamine, and agitating the mixture at 30° C. for 20 hours, and then at 90° C. for 16 hours. The polymerization reaction was stopped by adding 1 part of anhydrous ethanol. The polymer was purified by adding ether until handleable, stirring twice for 2 hours with 10% aqueous HCl, washing with water until neutral, stirring for 1 hour with 10% aqueous sodium hydroxide, again washing with water until neutral and then collecting the insoluble polymer, washing it three times with ether and once with ether containing a phenolic antioxidant, and drying. It was a white powder, highly crystalline by X-ray, and had an RSV of 2.6 as measured on a 0.1% solution in $\alpha$-chloronaphthalene at 170° C., a melting point of 175° C., and a number average molecular weight greater than 100,000.

This poly(isobutylene oxide) was dissolved, 1.02 parts, in 43 parts of dry toluene at 150° C., and then after cooling to 30° C., and while stirring, 0.19 part of butyllithium in 1.2 parts of n-hexane was added. The reaction mixture was stirred for 30 minutes and then 5 parts of 10% aqueous acetic acid was added and stirring at 30° C. was continued for 21 hours. The reaction mixture was washed neutral with water, once with 2% aqueous sodium bicarbonate, and again was washed neutral with water. The toluene-insoluble polymer was collected, washed once with toluene, and then was dried for 16 hours at 80° C. under vacuum. The product so obtained amounted to 0.84 part and was a white solid which had an RSV of 0.12 as measured on a 0.1% solution in $\alpha$-chloronaphthalene at 135° C., and a melting point of 169° C. Infrared analysis showed 1.0% hydroxyl and less than 0.07% >C=CH. The Mn calculated was 3400 and found Mn was 3100.

EXAMPLE 3

Example 2 was repeated except that 0.09 part of tert-butyllithium in 0.6 part of n-hexane was used in place of the butyllithium used in that example. The product amounted to 0.9 part of a white solid which on analysis showed 0.6% hydroxyl and no >C=CH. The calculated Mn was 5700 and found Mn was 5200.

EXAMPLE 4

Example 2 was repeated except that 0.70 part of n-octyllithium was used in place of the butyllithium used in that example. The product amounted to 0.8 part of a white solid, analyzing 2.5% hydroxyl, and no >C=CH. The Mn calculated was 1360 and the Mn found was 1250.

EXAMPLE 5

100 parts of the diol prepared in Example 2 and 38.4 parts of methylene di-p-phenyl diisocyanate were heated to about 120° C. over a period of 2 hours to give a prepolymer. The temperature was reduced and 2.22 parts of water and 1.00 part of silicone oil was added to the prepolymer with high speed stirring, causing foaming to occur. The foam so produced was cured for 5 minutes at 120° C. The resulting foam was hard and tough, with excellent properties at 100° C., and had a density of 6 lbs./cu. ft.

EXAMPLE 6

20 parts of the crystalline diol produced in Example 2 was dissolved by heating in 80 parts of a liquid poly(propylene glycol) having an Mn of 2,000, and the solution was mixed with 41 parts of tolylene diisocyanate (80:20 mixture of 2,4 and 2,6 isomers), and heated at 80–120° C. for 2 hours to form a prepolymer with excess diisocyanate. After cooling, the prepolymer was mixed with 3.24 parts of water, 0.45 part of triethylenediamine, 0.27 part of stannous octoate, and 1.0 part of silicone oil, with high speed stirring. The mixture was permitted to foam in an open box and then was cured for 5 minutes at 110° C. The resultant elastomeric foam was stronger and had better tear strength than a comparable foam prepared from the poly(propylene glycol) alone. It had a density of 3.1 lbs. per cu. ft.

What I claim and desire to protect by Letters Patent is:

1. As a new composition of matter, a crystalline diol of poly(isobutylene oxide), wherein each of the hydroxyl groups is attached to a terminal carbon of the polymer chain, said diol having a number average molecular weight between about 500 and about 20,000 and a melting point of about 150° C. to about 175° C.

2. The product of claim 1 wherein said diol has a number average molecular weight between about 1,000 and about 10,000.

References Cited

UNITED STATES PATENTS 2,522,155  9/1950  Ballard et al. _____ 260—615 X
3,149,083  9/1964  Gmitter.

LEON ZITVER, *Primary Examiner.*

H. T. MARS, *Assistant Examiner.*